UNITED STATES PATENT OFFICE.

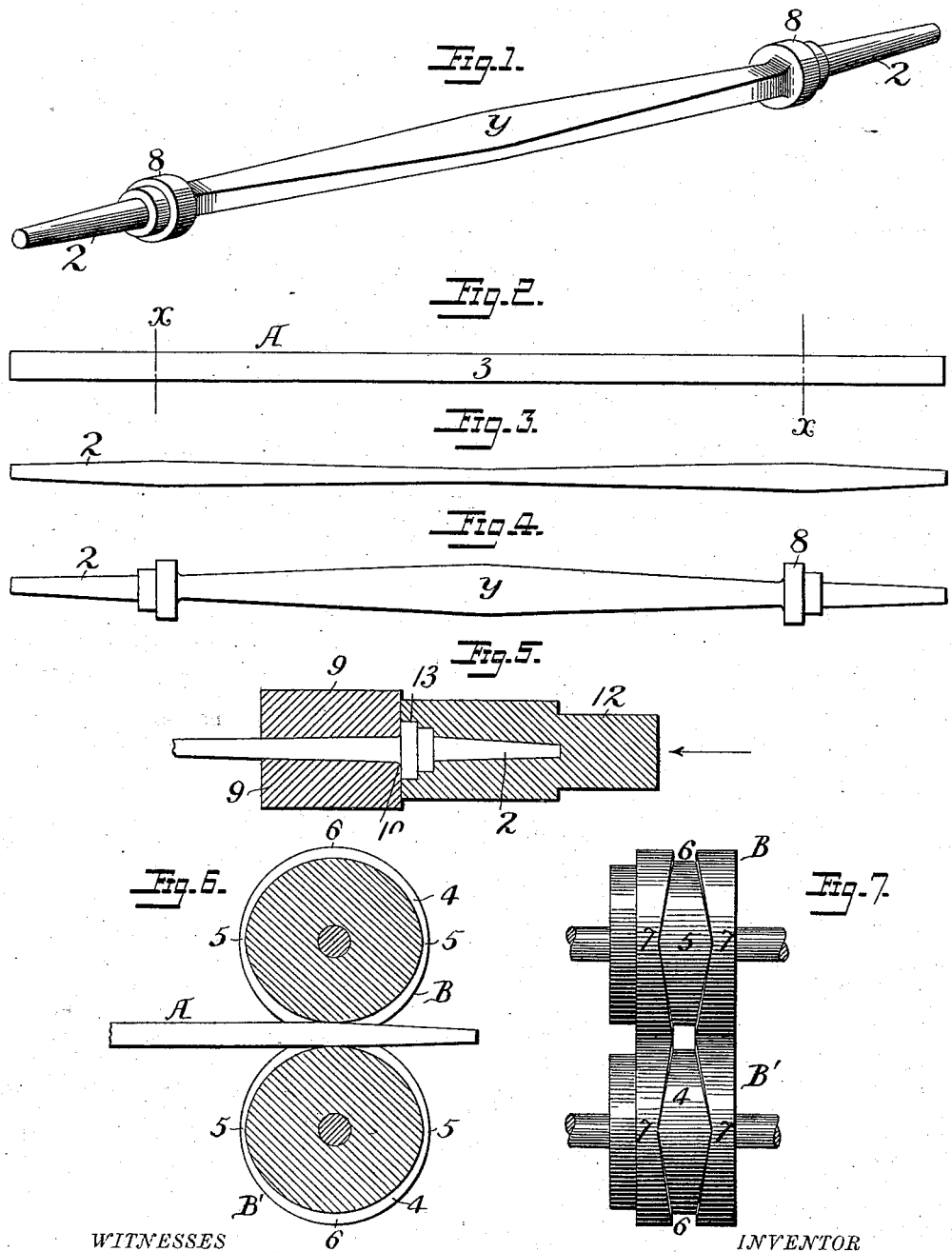

NICHOLAS P. H. HUGUS, OF WILKES-BARRÉ, PENNSYLVANIA, ASSIGNOR TO CHARLES L. SHELDON, OF AUBURN, NEW YORK.

MANUFACTURE OF FAN-TAIL AXLES.

SPECIFICATION forming part of Letters Patent No. 455,595, dated July 7, 1891.

Application filed April 22, 1891. Serial No. 390,025. (No model.)

*To all whom it may concern:*

Be it known that I, NICHOLAS P. H. HUGUS, a citizen of the United States, residing at Wilkes-Barré, in the county of Luzerne and State of Pennsylvania, have invented certain new and useful Improvements in the Manufacture of Fan-Tail Axles, of which the following is a specification.

The manufacture of what are known as "fan-tailed" axles for vehicles—that is, axles that are spread near the centers to afford widened seats for the wooden stiffening-bars clipped thereto—as carried on in the ordinary manner requires an objectionable amount of manipulation and the employment of skilled labor, with liability of defects resulting from imperfect welds, &c., which it is my object to avoid; and I accomplish this object by forming each axle-blank of a continuous bar of metal without welds and capable of being wholly formed by machinery, as fully set forth hereinafter, and as illustrated in the accompanying drawings, in which—

Figure 1 is a perspective view illustrating a fan-tail axle as constructed in accordance with my invention. Fig. 2 illustrates the bar from which the blank is formed. Figs. 3 and 4 are views illustrating different sides of the blank in different stages of its manufacture. Fig. 5 is a view illustrating means for forming the collar. Fig. 6 is a view illustrating a construction of rolls for rolling the blank to its desired shape. Fig. 7 is a face view of the rolls, Fig. 5.

The blank is produced from a bar of merchant iron or steel A, preferably rectangular in cross-section, which is operated upon at the opposite ends beyond the points $x\ x$, where the collars are to be situated to draw down these ends to a conical shape to constitute the usual journals or bearings 2 2, which are subsequently threaded at the ends to receive the usual nuts. This drawing down of the ends to form the journals may be effected before or after the intermediate part of the bar is operated upon, but is preferably effected after such operation upon the intermediate part. The intermediate section 3 of the bar between the points $x\ x$ is operated upon so as to spread the same gradually from each point $x$ toward the center $y$ of the bar to thereby gradually widen the same toward the center, as shown in Fig. 4, and in most instances the bar is also reduced in thickness from the points $x\ x$ toward the center to impart the general side outline shown in Fig. 3. The operations requisite to thus shape the portion 3 of the bar may be effected by means of different mechanical appliances—as, for instance, by means of rolls B B′, each with a groove 4, that gradually increases in depth from points 5 5 on opposite sides toward intermediate points 6 6, while said grooves also increase in width between the fillets 7 7 from the points 6 to the points 5. The bar A is introduced into the pass at the point where the latter presents the cross-sectional form of the bar—as, for instance, at the point 6—that portion of the bar that forms the journal projecting to the opposite side, as shown in Fig. 6, after which, by the revolution of the rolls, the bar is reduced and spread until the elevated portions 5 pass the central line or plane of the axis, after which the reduction and spreading of the bar gradually diminish until said bar passes the points 6. In the construction shown each operation is effected by a half-revolution of each roll, the bar then being withdrawn and another bar being operated upon on the next half-revolution of the rolls.

The usual collar 8 is formed by clamping the body of the bar adjacent to the point $x$ between two jaws 9 9, of proper shape, having die-recesses 10, conforming to the form to be imparted to the inside of the collar, and then bringing a die 12 upon the projecting end of the bar, said die having a recess to receive the tapering journal, enlarged at 13 to conform to the form of the outer face of the collar, the bar being compressed longitudinally and upset at the point $x$, so as to fill the recesses 10 13, imparting the proper collar projection 8 to the blank. After the collar projections 8 have been formed upon both ends the blank is in shape to be finished in the lathe in the usual manner.

Where it is not desired to reduce the thickness of the bar at the center $y$, it is rolled to widen it only, leaving it of uniform thickness throughout.

While I have referred to the forming of the ends of the bar as following the operations upon the intermediate portion or stock, if desired, the end portion or journals may be finished first and the intermediate portion operated upon subsequently, and while I have referred to the bar as being upset to form the collars as integral parts of the continuous homogeneous bar, and as is preferable in carrying out my invention, I do not limit myself to this mode of forming the collars, as the same may be made in separate pieces and shrunk on or otherwise secured.

By the above-described series of operations I am enabled to make the bar without the use of the skilled labor heretofore required, without danger of burning the metal in welding, and without those imperfections which result from incomplete welds, while the cost of production is greatly diminished, and the axle produced is stronger and may therefore be less in weight than those made in the ordinary manner.

I do not here claim the method of manufacturing fan-tailed axles herein set forth nor the apparatus described therefor, while the process constitutes the subject of a separate application, Serial No. 390,024.

I claim as my invention—

1. As a new article of manufacture, a blank for fan-tailed axles, widened at the center from points adjacent to the ends, and consisting of a continuous bar of metal, substantially as described.

2. As a new article of manufacture, a blank for fan-tailed axles, consisting of a continuous bar gradually widened and also reduced in thickness from a point $x$ distant from each end and to the center, substantially as set forth.

3. A blank for fan-tailed axles, consisting of a continuous bar having conical ends and shoulders or collars and an intermediate portion which is gradually widened in one direction and reduced in thickness in the opposite direction from each collar to the center, the whole consisting of a continuous unwelded bar, substantially as set forth.

In testimony whereof I have signed my name to this specification in the presence of two subscribing witnesses.

N. P. H. HUGUS.

Witnesses:
GEORGIA P. KRAMER,
ISABELLE A. FAIRGRIEVE.